April 14, 1942.  C. A. CHERRY  2,279,899
TOOL HOLDER
Filed Nov. 6, 1939
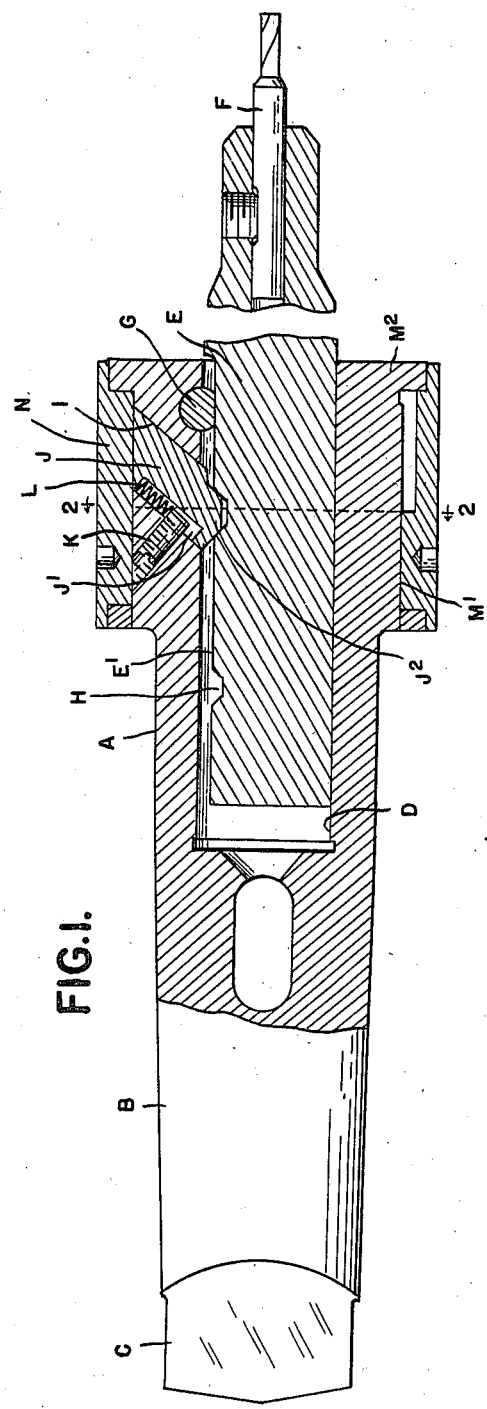
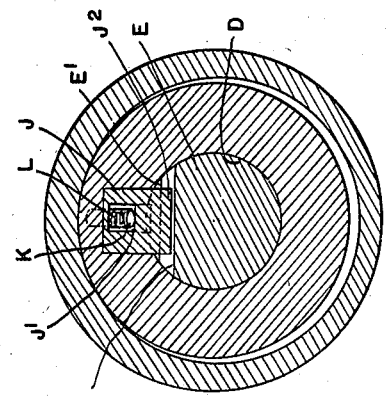
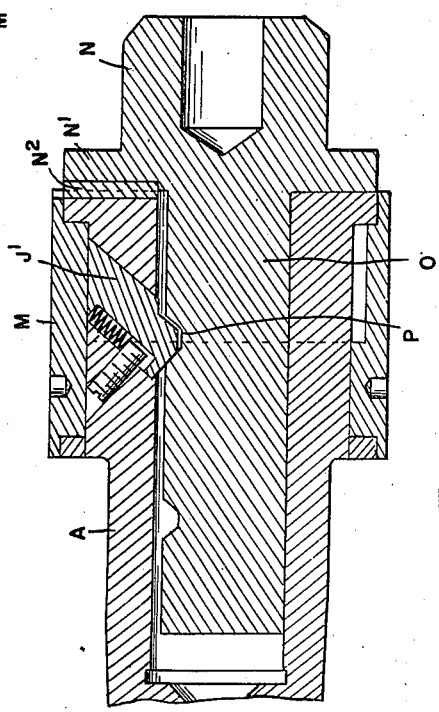
INVENTOR.
CHARLES A. CHERRY
BY
ATTORNEYS Patented Apr. 14, 1942

2,279,899

UNITED STATES PATENT OFFICE 2,279,899

TOOL HOLDER

Charles A. Cherry, Detroit, Mich., assignor, by mesne assignments, of one-half to Francis W. Haines, Detroit, Mich.

Application November 6, 1939, Serial No. 303,125

4 Claims. (Cl. 279—81)

The invention relates to tool holders and has more particular reference to holders for boring tools, and milling cutters. It is the object of the invention to obtain a construction permitting of quick exchange of boring tools and milling cutters, and which is provided with means for exactly positioning said tools each time they are re-engaged with the holder. To this end the invention consists in the construction as hereinafter set forth.

In the drawing:

Figure 1 is a central longitudinal section through my improved holder showing an end mill adapter engaged therewith;

Figure 2 is a cross section on line 2—2 of Figure 1;

Figure 3 is a view similar to Figure 1 showing a holder with a different type of adapter.

A is a tool holder socket which is provided with a tapering shank B for engagement with a corresponding tapering recess in any rotary spindle and also having a flattened tang C for communicating torque thereto. The socket A has an axially extending cylindrical recess D for receiving the shank of an adapter which directly holds the tool. As specifically shown, the adapter E is designed to hold an end mill F, but any other tool such as a facing cutter may be used in place thereof.

With certain types of work, it is necessary to exchange tools for successive steps in a cycle of operations which is then repeated. In each of these operations the tool used must be exactly positioned longitudinally in relation to the socket which holds it, but it is highly desirable that the time required for exchange of tools be reduced to the minimum. This I have accomplished with my improved construction as follows.

The shank of the boring tool E while generally of cylindrical form is flattened on one side as indicated at E'. This flattened portion engages a key G which extends transversely across the shank B so as to intersect the cylindrical recess D. This key will transmit torque from the socket to the tool holder E, but does not interfere with the axial movement of the latter. To position the holder longitudinally I have provided it with one or more transversely extending grooves H in the flattened portion E' thereof, said grooves having oppositely inclined side walls at an exactly predetermined angle to each other. The socket B has formed therein an inclined bore I which preferably is at the same angle to the axis of the holder as the forward side wall of the groove H. J is a cylindrical member fitting the bore I and provided with a keyway J' for receiving a key K holding it from rotation while permitting longitudinal movement. The key K has a threaded shank engaging a correspondingly threaded bore in the member B extending perpendicular to the bore I. This key also forms an abutment for one end of the spring L which is located in the keyway J', the opposite end of said spring bearing against the end of the keyway so as to yieldably press the member J in an outward direction. The inner end of the member J is fashioned to form a transversely extending wedge-shaped member $J^2$ for fitting into the groove H. The outer end of the member J bears against the inner face of a sleeve M surrounding the member A. This sleeve has a portion M' of its inner surface cylindrical and fitting the member A, but another portion $M^2$ of this inner surface which engages the member J, is eccentric. Thus, when the sleeve is rotated in one direction it will permit the member J to be moved outward by the resilient pressure of the spring L. On the other hand, when the sleeve is rotated in the reverse direction the eccentric surface $M^2$ will operate as a cam for gradually forcing the member J inward and pressing the portion $J^2$ thereof into engagement with the transverse slot H. The angle of the eccentric surface $M^2$ with respect to the concentric surface M' is so limited as to be within the angle of friction and consequently any reaction causing an outward thrust on the member J will have no effect in displacing the sleeve. It is, therefore, possible to exactly position the member E longitudinally within the recess D in the member A and to rigidly lock it in this position. If, however, it is desired to exchange tools, rotation of the sleeve M will withdraw the cam permitting the member J to move outward under actuation of the spring L until the transverse portion $J^2$ clears the groove H.

My holder can also be used with different types of adapters, such for instance as the flange type, shown in Figure 3. As shown therein, N is the adapter having the shank O for fitting in the holder and provided with the transverse groove P similar to the groove H. There is also a radial flange N' which abuts against the end of the socket A. The holding member J' is similar to the one previously described and is actuated by the cam sleeve M to engage the wedge-shaped portion with the channel P. However, instead of bearing upon both sides of this channel the wedge portion bears only on the rear side of the channel, thereby forcing the shank O rearward and clamping the flange N' against the holder A. This will insure a rigid connection for the tool which is mounted on the adapter.

What I claim as my invention is:

1. A tool holder comprising a member having an axially extending cylindrical socket therein and a transverse bore in the wall of said socket inclining rearward in an inward direction, a member having a cylindrical shank for engaging said cylindrical socket and with a transverse V-shaped groove therein, a member slidable in said transverse bore having its inner end wedge-shaped to be parallel with and engage said V-shaped groove, and a sleeve rotatable upon said socket member provided with an eccentric recess forming a cam for engaging the outer end of said slidable member whereby said shank is locked or unlocked by the rotation of said sleeve and when locked is exactly positioned in said socket axially, radially and rotatively.

2. The combination with a member having an axially extending cylindrical socket and with a bore through the wall thereof inclining rearward in an inward direction, a member having a cylindrical shank for engaging said cylindrical recess with a flattened side and a V-shaped rectilinear groove extending transversely thereof, a key extending transversely through said socket member to engage said flattened side and hold said shank against rotation while permitting axial movement thereof, a member slidably engaging said transverse bore being fashioned at its inner end with a wedge-shaped portion for engaging said V-shaped groove, resilient means for normally forcing said slidable member in an outward direction, and a sleeve rotatable upon said socket member having an eccentric recess therein forming a cam for engaging the outer end of said slidable member, whereby a rotation of said sleeve in one direction will force the wedge-shaped end of said slidable member inward to lock and exactly position said shank in said socket axially, radially and rotatively while the rotation of said sleeve in the opposite direction will release said slidable member permitting the outward movement thereof under actuation of said resilient means.

3. The combination with a member having an axially extending cylindrical socket and a bore through the wall of said socket inclining rearward in an inward direction, a member having a cylindrical shank for engaging said cylindrical socket and with a V-shaped groove extending transversely thereof, a member slidable in said inclined bore fashioned at its inner end with a wedge-shaped portion for engaging said V-shaped groove, said member also having a longitudinally extending keyway therein, a threaded pin engaging the threaded recess in the wall of said socket member and with its inner end engaging said keyway to hold said slidable member against rotation, a spring in said keyway abutting against said pin and yieldably pressing said slidable member in an outward direction, and a sleeve rotatable upon said socket member having an eccentric recess therein forming a cam for engaging the outer end of said slidable member whereby the rotation of said sleeve in one direction will force said slidable member inward to lock and exactly position said shank and rotation in the opposite direction will release said shank.

4. A tool holder comprising a member having an axially extending cylindrical socket therein and a bore extending transversely through a wall of the socket inclining rearward in an inward direction, an adapter member having a cylindrical shank for engaging said socket provided with a transverse groove therein and a radial flange for engaging the outer end of said holder, a member slidably engaging said transverse bore having its inner end fashioned to engage said transverse groove and bear against the inner wall thereof and a sleeve rotatable upon said socket member having an eccentric recess therein forming a cam for engaging the outer end of said slidable member to force the inner end thereof into said groove and to impart an axial thrust on said cylindrical shank to press said radial flange against the end of said holder, thereby exactly positioning said shank in said socket axially, radially and rotatively.

CHARLES A. CHERRY.